UNITED STATES PATENT OFFICE.

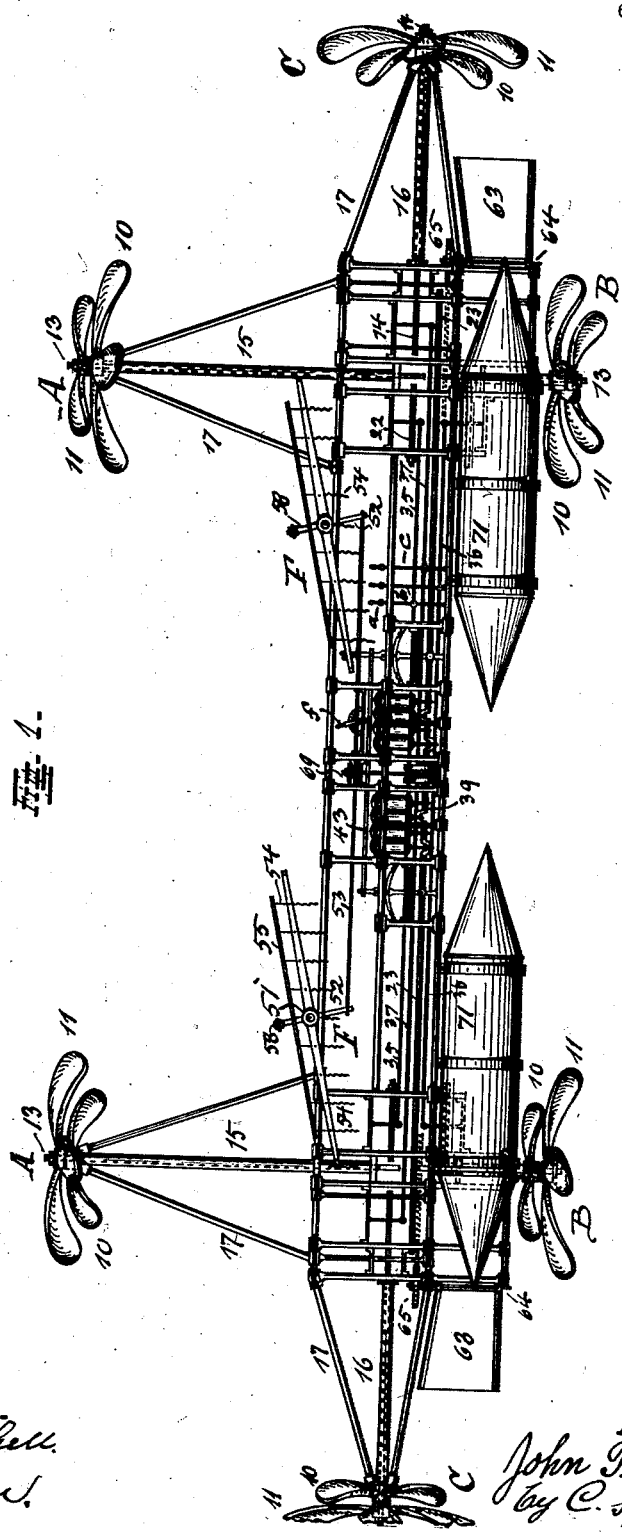

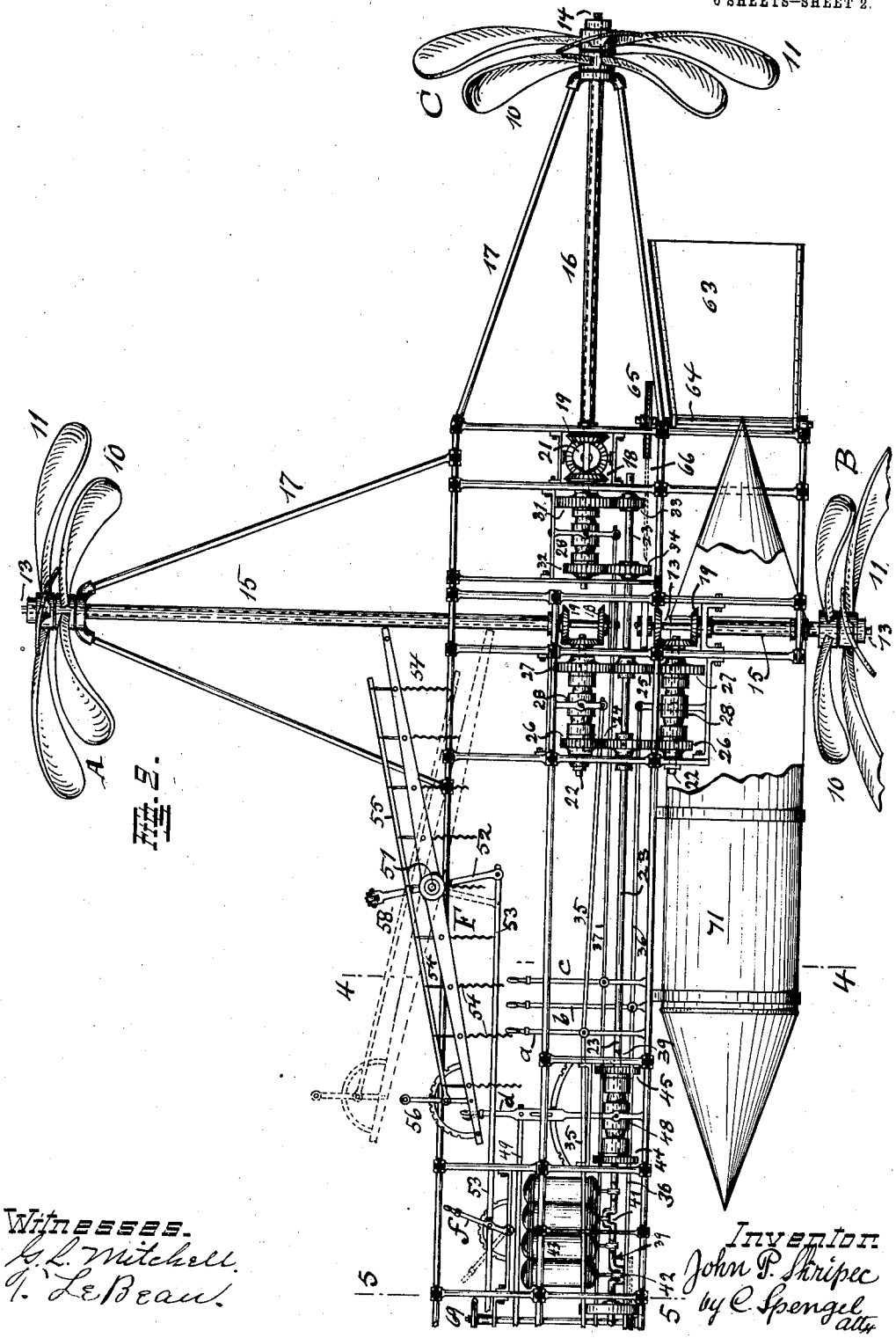

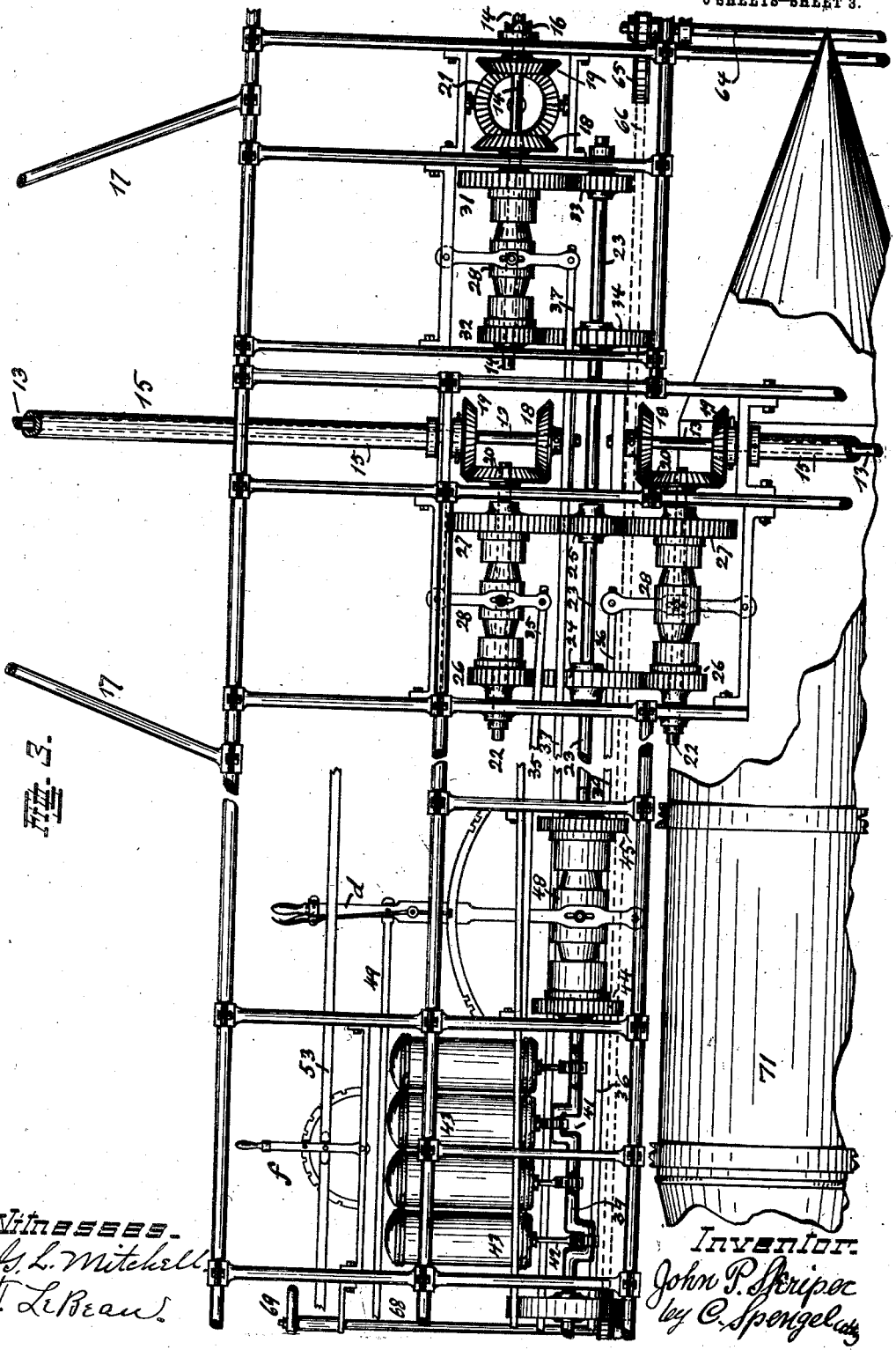

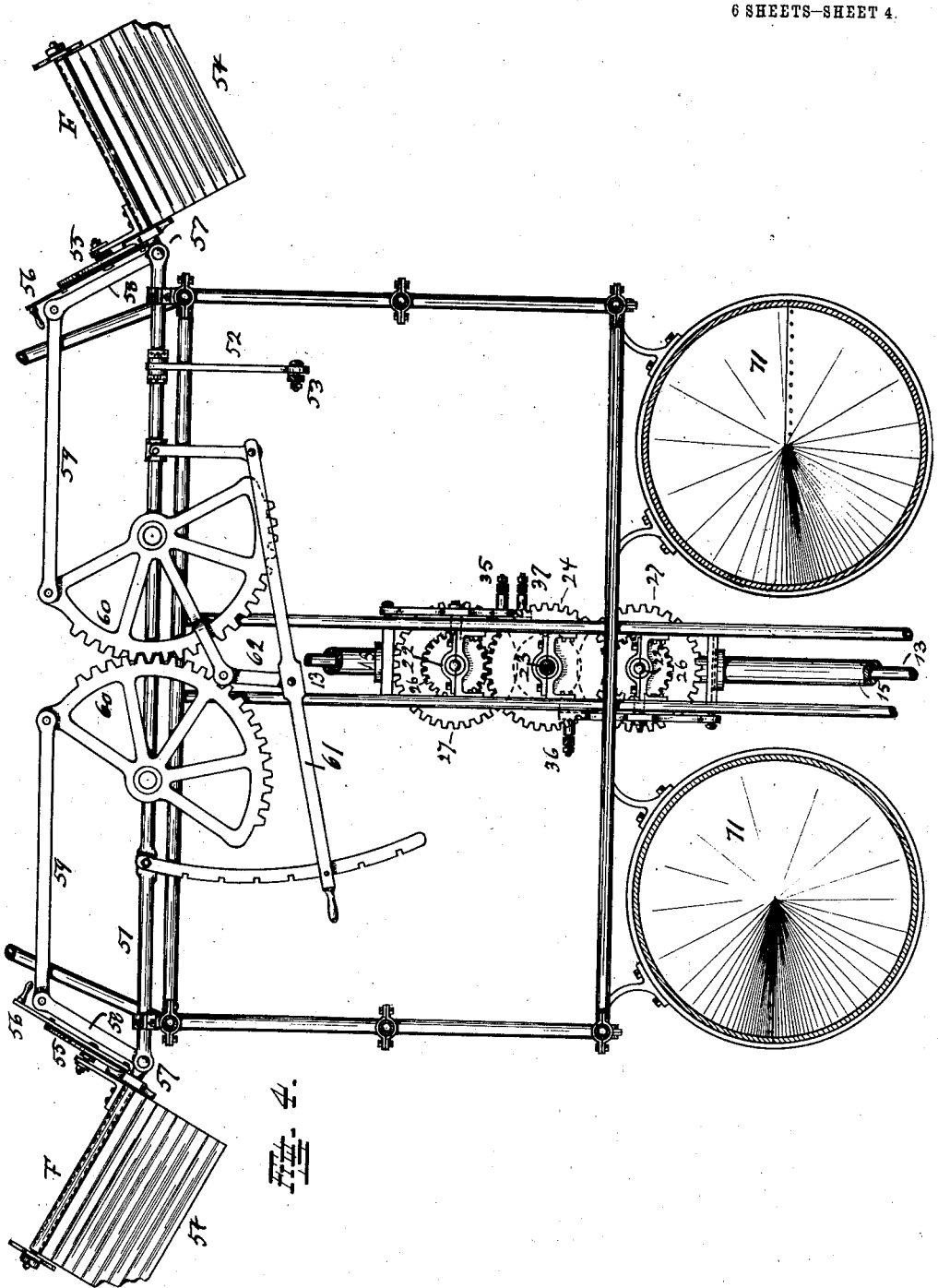

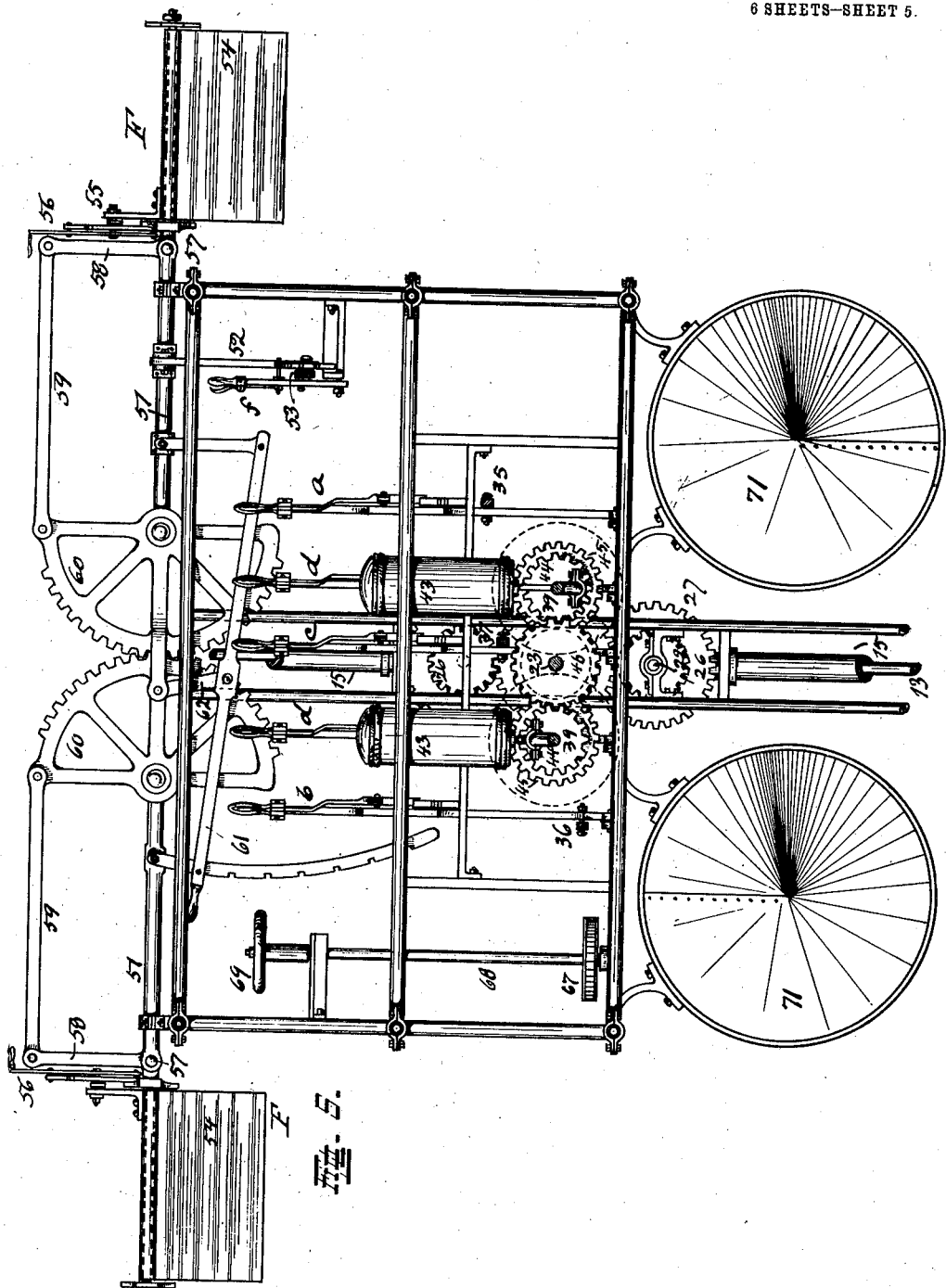

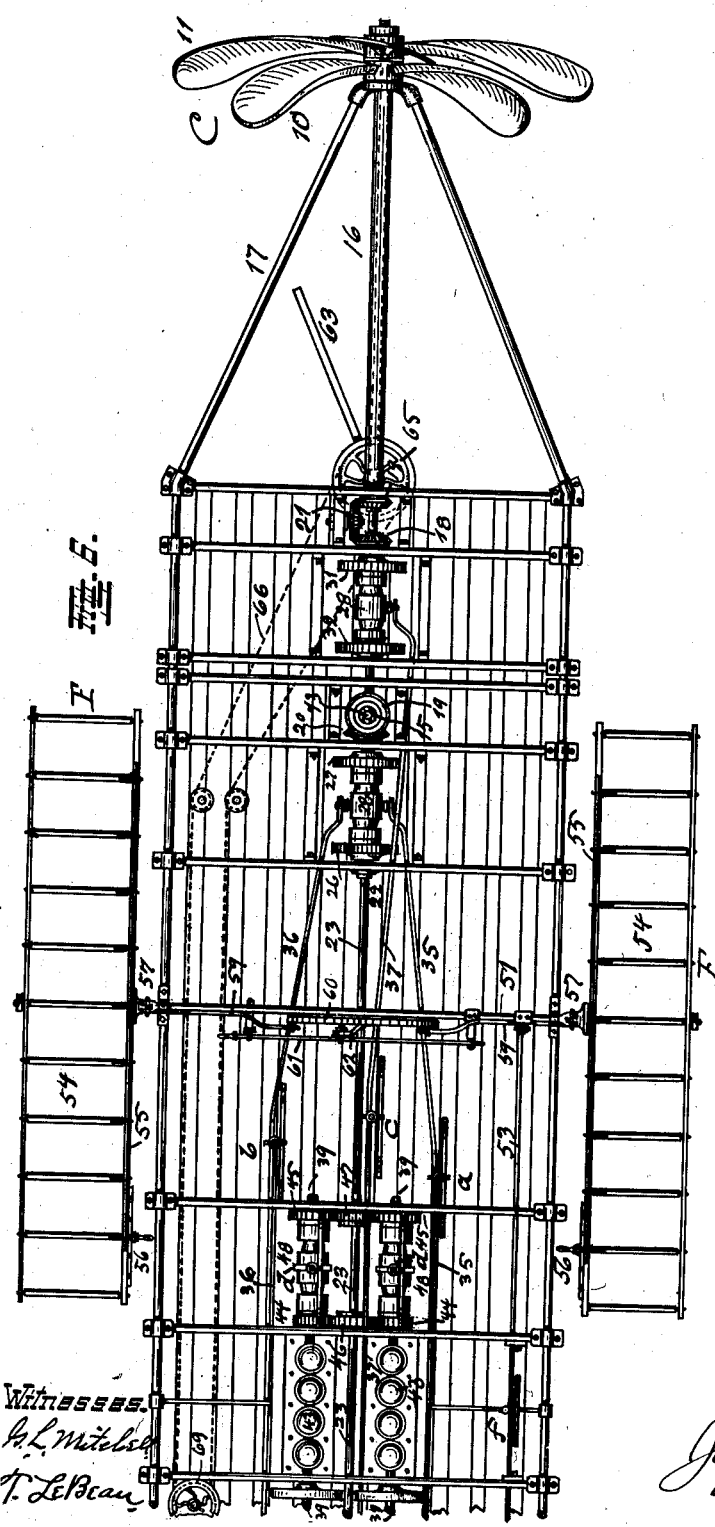

JOHN P. SKRIPEC, OF CINCINNATI, OHIO.

AIRSHIP.

1,011,256.  Specification of Letters Patent.  Patented Dec. 12, 1911.

Application filed January 27, 1910. Serial No. 540,418.

*To all whom it may concern:*

Be it known that I, JOHN P. SKRIPEC, a subject of Austria, and residing at Cincinnati, Hamilton county, State of Ohio, have invented certain new and useful Improvements in Airships; and I do declare the following to be a clear, full, and exact description thereof, attention being called to the accompanying six sheets of drawings, with the reference characters marked thereon, which form also a part of this specification.

The subject of this invention is an aerial vessel or ship, embodying in its construction certain novel features which will be described more fully hereinafter and pointed out in the claims.

The invention is illustrated in the accompanying six sheets of drawings, in which:—

Figure 1, shows a side-elevation of the air-ship. Fig. 2, in a similar view with parts broken away shows on a larger scale the airship at approximately half its length. Fig. 3 is a part of Fig. 2, still more enlarged and shows more particularly driving mechanism. Fig. 4, is an enlarged transverse section taken on line 4—4 of Fig. 2. Fig. 5, is a similar section taken on line 5—5 of Fig. 2. Fig. 6, is a top view of Fig. 2.

Blade-propellers, rotated by motors, explosive-engines for instance, furnish the power for moving the air-ship vertically, as well as horizontally. Auxiliary devices for changing the direction of these movements and for controlling them otherwise are provided. There are elevating or lifting propellers which rotate in horizontal planes, provided above and below the ship, two A—A, being shown above and two B—B are shown below the same. There are also moving or traveling propellers, meaning thereby those which move or advance the ship horizontally, they rotating in vertical planes, one being provided at each end as shown at C—C. Each propeller consists of two sets of blades, 10 being the inner sets, and 11 the outer sets. These terms "inner and outer" are here used with reference to the body of the ship, the inner sets of blades for instance, being those nearest this body. This latter consists of a suitable framework, made up of longitudinal members, held together by transverse members and provided with means to support the propeller-shafts, the motors for operating them, flooring to sustain any load, as well as any passengers and operatives, also auxiliary means and mechanism necessary in the operation and management of the ship. This frame-work is preferably made of tubing of light weight but sufficient rigidity.

The blades of the propellers are set and shaped in the proper manner, to act upon the air and they are curved between their ends as shown, one set in each propeller rotating in a direction opposite to that of the other set. The resistance, due to the whirling air-currents retarded between the two sets of blades produce superior lifting and propelling-effects. The blades of a set are connected to a hub, which hubs are mounted upon shafts, there being a shaft for the hub of each set of blades and two shafts to each propeller, the shafts for the inner sets of blades being hollow to receive the shafts of the outer sets.

13 are the shafts for the outer blades of the lifting propeller and 14 are the shafts for the outer blades of the traveling propellers.

15 are the hollow shafts for the inner blades of the lifting propellers and 16 are the hollow shafts for the inner blades of the traveling propellers. The outer shafts are supported in a suitable manner by bearings and braces 17 connected to the general frame-work. The means for operating these propellers are best shown in Fig. 3, no attempt having been made to show them in Fig. 1, on account of the small scale. The inner shafts are supported within the hollow shafts around them. Each of these shafts is provided with a bevel-wheel, 18 being those on the inner shafts and 19 those on the outer shafts, these wheels being sufficiently spaced apart to admit a driving-bevel-wheel between them, there being a driving-wheel for the two shafts of each propeller.

20 are the drivers for the shafts of the lifting propellers and 21 are those for the shafts of the traveling propellers and it will be readily understood by observing the arrangement whereby each driver engages the bevel-wheels of the two shafts of a propeller, how rotation in opposite direction of the two sets of blades in each propeller is brought about. The drivers 20 for the lifting propellers are mounted upon shafts 22 and the arrangement is so that always three propellers, an upper and a lower lifting propeller and one traveling propeller are grouped, one fore and one aft of the ship for actuation by one shaft. This is done by intermediate shaft 23, supported between the two sets of shafts 22—22 fore and aft which actuate the lifting propellers and which extends also beyond these shafts to permit actuation of the traveling propellers, the actuation in each case being by gear-connection. For such purpose and with reference to actuation of the lifting propellers, larger gear-wheels 24 and smaller ones 25 are mounted upon this shaft 23 fore and aft, and each of which drives one of two gear-wheels on each of shafts 22, the larger one 24 driving two smaller ones 26—26, one on each side of it, and the smaller one 25 driving two larger ones 27—27 one on each side of it. These gear-wheels 26 and 27 are loosely mounted and act upon their respective shafts 22 only when either one of them is connected to it by clutch-devices 28, one being mounted on each of shafts 22. A slower or a faster speed may thus be transmitted according to whether the larger gear 27, or the smaller one 26 is connected for the time being to its shaft 22. In the intermediate position shown, no motion is transmitted to the propellers corresponding to the particular shaft.

The operation of the shafts of the traveling propeller forming part of the group is substantially the same, the slight changes made being merely due to the difference of location. The equivalent of shaft 22 is obtained by extension of inner shaft 14 of this propeller which is operatively connected to shaft 23 to be driven by it at two speeds. Driving-connection to the outer propeller shaft is by the interposed idler 21 which is driven by bevel-gear 18 on the inner propeller shaft and drives the outer propeller shaft 16 by means of bevel-wheel 19. Otherwise the construction is the same, there being two gears 31 and 32 of graduated sizes loosely mounted on the extension of shaft 14, engaged by complementary gears 33 and 34 on shaft 23. Transmission of motion at either one of two speeds is controlled by a clutch-device 28 on extended shaft 14 similar to those on shafts 22. Each of these three clutches in a group fore and aft may be independently manipulated for the purpose of controlling the starting, stopping, and changes from one speed to another of each propeller. This manipulation is by hand-levers $a$, $b$ and $c$ provided in positions to be within convenient reach of the operator and to which the clutch-devices of the various propellers are connected by suitable rods. Fig. 2, shows these levers most plainly, also Fig. 6. There are two rods 35, on lever $a$ one extending forward to control the clutch of the upper lifting propeller A in the forward group of propellers and one extending rearward to control the clutch of the upper lifting propeller A in the rear group of propellers. Two rods 36 on lever $b$ are engaged in a similar manner with reference to the clutches of the lower lifting propellers in the fore and aft groups. The clutches of the traveling propellers of both groups are connected to lever $c$ by rods 37.

While each group of propellers fore and aft, might have its independent drive-shaft 23, moved by independent motive power, I prefer to use one shaft only which extends through the entire length of the vessel so as to permit operative connection in the manner described, to all the propellers, lifting as well as traveling, contained in the two groups. This shaft is actuated by any suitable motive power, preferably by motors of the explosive-engine type. By preference I use four motors or groups of motors, each motor or group of motors actuating a power shaft 39 which has four cranks 41, set at quarters and connected to piston-rods 42, the pistons of which are reciprocated within four cylinders 43. There are two crank-shafts 39 alined endwise on one side of driving shaft 23 and two opposite on the other side, and near the end of each of them, there are two gear-wheels 44 and 45 of different sizes loosely mounted, those of like size being opposite each other on opposite shafts. In the space between each set of these opposite gears on the crank-shafts, and on shaft 23 there are gears 46 and 47 respectively, they being also necessarily of different sizes.

Clutches 48 are provided on each crank-shaft between the two gears thereon, the clutches of alined shafts being connected by rods 49, so that they may be simultaneously manipulated by means of levers $d$, one of which is on each side of the center-shaft 23. (See Fig. 2.) It will now be seen that the main propeller driving-shaft 23 may be rotated at either one of two speeds and may also be operated by all four crank-shafts simultaneously, or by two only on one side of it according to requirements of speed and power. This arrangement is also of advantage if one of the motors should get out of order in which case the vessel is not entirely disabled. These levers $d$ $d$ as well as lever $a$ for the upper propellers, lever $b$ for the lower propellers and lever $c$ for the end propellers are by preference closely grouped to permit convenient manipulation from one position. (See Figs. 2, 5 and 6.) It will also be noted that either of the speeds received by shaft 23 from the power-shafts and as controlled by levers *d d*, is subject to further modification in its transmission to the propeller-shafts by levers *a, b* and *c* which directly control this transmission, whereby the range of speeds available for rotating the propellers is accordingly increased.

Operations for moving the ship are started by the setting in motion of the lifting propellers whereby the ship is raised to gain sufficient elevation to clear any obstruction likely to interfere with its travel. After that, the traveling propellers are also started and the operation of the lifting-propellers is so modified as to merely maintain the ship at the desired height without further raising it. This modification of the operation of the lifting propellers may be had by reducing their speed, or by stopping entirely the motion of some of them, for instance the lower ones. Maintenance of position at a certain elevation is assisted by aeroplanes F arranged in equal numbers opposite each other on opposite sides of the ship. They are pivotally supported on shafts 51, which have arms 52 connected by links 53 to lever *f*, whereby their angular position may be adjusted. By tilting these aeroplanes accordingly, the direction of the horizontal motion of the ship may also be modified, so as to cause the ship to rise or descend irrespective of the action of the lifting-propellers. Each aeroplane consists of a number of flaps 54, each pivotally supported across the frame of the aeroplane and all connected by a rod 55, subject to the manipulation by a lever 56. Thereby adjustment of these flaps to a vertical position is possible to prevent resistance when the ship is lifted or lowered. When traveling forward, these flaps are adapted to be alined so that the aeroplanes present intact surfaces. These aeroplanes may also be tilted transversely as shown in Fig. 4, for which purpose they are connected to their shafts by articulated joints 57. Arms 58 connected by links 59 to intermeshing gear segments 60, are provided subject to control by a lever 61, to which one of them is connected by a link 62, so that each pair of opposite wings may be tilted simultaneously. Forward travel is directed by rudders 63 the stems 64 of which carry chain-wheels 65, connected by chains 66 to chain-wheel 67 on a steerage post 68, manipulated by a hand-wheel 69. Air-chambers 71 are provided to sustain the ship in case the same should, for any reason, alight upon water.

Having described my invention, I claim as new:

1. In an air-ship, the combination of a suitable elongated frame-work, moving propellers arranged in groups provided thereon, shafts on which these propellers are mounted, a driving-shaft operatively connected to all the propellers of each group, means whereby the operative connection between a propeller and this drive-shaft is controlled, motors arranged in groups, a crank-shaft operated by each group and constituting a power-shaft, operative connection, graduated as to speed, between these power-shafts and the aforementioned driving-shaft and means to control this operative connection between these power-shafts and the driving-shaft.

2. In an air-ship, the combination of a suitable frame-work, moving propellers provided thereon, means to operate these propellers, pivotally supported elongated aeroplanes provided on opposite sides of the frame which are arranged parallel to this frame and have transversely arranged flaps adjustably supported, means to simultaneously adjust the position of all the flaps on an aeroplane and means to lock these flaps positively in their adjusted position.

3. In an air-ship, the combination of a frame-body fitted with propelling means, motor-mechanism to actuate these propelling means, elongated aeroplanes adjustably supported on the frame-body arranged parallel thereto and consisting of a number of transversely arranged, adjustably supported flaps, a rod whereby all flaps on an aeroplane are connected for simultaneous adjustment, an adjusting lever supported on each aeroplane and connected to the rod mentioned to manipulate the same and means to lock this lever in its adjusted position.

4. In an air-ship, the combination of a frame-body fitted with propelling means, motor-mechanism to actuate these propelling means, elongated aeroplanes on both sides of the frame-body arranged in pairs parallel to each other and to the frame body, one plane opposite the other, rock-shafts supported transversely across the frame-body on which the aeroplanes are supported, one on each end of a rock-shaft and being connected thereto by means of articulated joints, means whereby the position of these aeroplanes, transversely considered, may be angularly adjusted with reference to the rock-shaft on which they are carried and means to lock these aeroplanes to their rock-shafts in their adjusted positions.

5. In an air-ship, the combination of a frame-body fitted with propelling means, motor-mechanism to actuate these propelling means, aeroplanes on both sides of the frame-body arranged in pairs, one plane opposite the other, rock-shafts supported transversely across the frame-body on which the aeroplanes are supported, one on each end of a shaft and being connected thereto by means of articulated joints, an arm on each aeroplane, intermeshing segmental gears on their shaft, a link connecting each plane to a segmental gear and means to manipulate one of these gears to simultaneously adjust the position of the planes on their shaft.

In testimony whereof, I hereunto affix my signature in the presence of two witnesses.

JOHN P. SKRIPEC.

Witnesses:
C. SPENGEL,
T. LE BEAU.